(12) United States Patent
Ponsford et al.

(10) Patent No.: US 8,688,847 B2
(45) Date of Patent: Apr. 1, 2014

(54) SYSTEM AND METHOD FOR NETWORK CONNECTION ADAPTATION

(75) Inventors: Simon Ponsford, Doha (QA); Simon Guerrero, Devizes (GB)

(73) Assignee: Qatar Foundation, Doha (QA)

( * ) Notice: Subject to any disclaimer, the term of this patent is extended or adjusted under 35 U.S.C. 154(b) by 193 days.

(21) Appl. No.: 13/221,030

(22) Filed: Aug. 30, 2011

(65) Prior Publication Data

US 2013/0054751 A1    Feb. 28, 2013

(51) Int. Cl.
    *G06F 13/00*    (2006.01)
(52) U.S. Cl.
    USPC ............................... 709/228; 709/227
(58) Field of Classification Search
    USPC ............... 709/227, 228, 238, 217–219
    See application file for complete search history.

(56) References Cited

U.S. PATENT DOCUMENTS

| | | | |
|---|---|---|---|
| 7,424,543 B2 * | 9/2008 | Rice, III | 709/229 |
| 8,462,681 B2 * | 6/2013 | Pochiraju et al. | 370/310 |
| 2002/0174010 A1 | 11/2002 | Rice et al. | |
| 2008/0043643 A1 * | 2/2008 | Thielman et al. | 370/260 |
| 2010/0278086 A1 | 11/2010 | Pochiraju et al. | |

FOREIGN PATENT DOCUMENTS

| | | |
|---|---|---|
| GB | 2494127 A | 3/2013 |
| GB | 2494128 A | 3/2013 |
| WO | 2008014181 A1 | 1/2008 |
| WO | 2013029820 A1 | 3/2013 |
| WO | 2013029821 A1 | 3/2013 |

OTHER PUBLICATIONS

Examination Report in GB1114875.6 dated Dec. 22, 2011.
International Search Report and Written Opinion in PCT/EP2012/060060, dated Nov. 5, 2012.

* cited by examiner

*Primary Examiner* — Kenneth Coulter
(74) *Attorney, Agent, or Firm* — Mossman Kumar & Tyler PC

(57) ABSTRACT

A computer implemented method for performing automatic latency mitigation in a remote access system comprises using a network connection between a client in remote access with a server to define a virtual channel for determining latency in the network connection, and providing a latency value for the connection. The latency value is used to determine a mitigating action for reducing the latency or the effect of latency in the connection, and the mitigating action is executed at the client.

26 Claims, 5 Drawing Sheets

SYSTEM AND METHOD FOR NETWORK CONNECTION ADAPTATION

The present invention relates to systems and methods for network connection adaptation between client and server devices in a network.

BACKGROUND

An application sharing protocol enables multipoint device application sharing by allowing a view onto a host or shared device application executing at one site to be advertised within a session executing on other devices at other sites, particularly remote ones. A device at each site can, under specified conditions, take control of the shared device application by sending remote keyboard and pointing device information for example.

Application sharing protocols were originally intended for use over a local area network (LAN) where available bandwidth and latency were not typically an issue. However, the bulk of application sharing tool usage now takes place over wide area networks (WANs) such as the internet where such matters can affect the use of the tools, particularly over connections which exhibit high latency. Because latency over WANs can vary greatly, it is difficult to design a system whose graphical capabilities and frequency of updates are appropriate to the connection type being used.

SUMMARY

According to one aspect of the present invention, there is provided a computer implemented method for performing automatic latency mitigation in a remote access system, the method comprising using a network connection between a client in remote access with a server to define a virtual channel for determining latency in the network connection, and providing a latency value for the connection, using the latency value to determine a mitigating action relating to the latency in the connection, and executing the mitigating action at the client.

In such a method, the mitigating action may serve to reduce the latency in the connection, or may serve to reduce an effect on a user of the latency in the connection.

In such a method, the virtual channel is used to transmit data representing the latency value between the client and the server using the network connection.

Such a method may further comprise compiling a limited running list of historic latency values, and using the list to determine an average value for the latency between the client and server.

Such a method may further comprise providing multiple threshold values representing respective different connection statuses, assigning a status for the connection using the average value, and incrementing or decrementing a counter associated with the statuses based on the assigned status to provide a current status for the connection.

Such a method may further comprise providing a profile list including multiple display parameters for a display device of the client, wherein respective ones of the parameters map to respective ones of the connection statuses.

Such a method may further comprise adjusting a parameter of the display device on the basis of the current status and according to the profile list.

In such a method, the multiple display parameters may include a resolution and colour depth for the display device.

Such a method may further comprise providing a profile list including multiple audio parameters for an audio device of the client, wherein respective ones of the parameters map to respective ones of the connection statuses.

Such a method may further comprise adjusting a parameter of the audio device on the basis of the current status and according to the profile list.

In such a method, the latency value may be determined using a difference between a timestamp in a message received by the server from the client and a current timestamp value of the server.

The network connection may be a TCP connection.

According to another aspect of the present invention, there is provided a server comprising a server component to receive data from a client over a virtual channel representing a value for the latency in a physical connection for remote access therebetween, to use the latency value to determine a mitigating action relating to the latency in the connection, and to send instruction data to such a client in order to execute the mitigating action at the client.

In such a server device, the mitigating action may serve to reduce the latency in the connection, or may serve to reduce an effect on a user of the latency in the connection.

In such a server device, the server component may be operable to use the virtual channel to transmit data representing the latency value between the client device and the server device, to the client device using the network connection.

In such a server device, the server component may be operable to compile a limited running list of historic latency values, and to use the list to determine an average value of latency between the client device and server device.

In such a server device, the server component may be operable to provide multiple threshold values representing respective different connection statuses, to assign a status for the connection using the average value, and to increment or decrement a counter associated with the statuses based on the assigned status to provide a current status for the connection.

In such a server device, the server component may be operable to provide a profile list including multiple display parameters for a display device of the client device, wherein respective ones of the parameters map to respective ones of the connection statuses.

In such a server device, the server component may be operable to adjust a parameter of the display device on the basis of the current status and according to the profile list.

In such a server device, the multiple display parameters may include a resolution and colour depth for the display device.

In such a server device, the server component may be operable to provide a profile list including multiple audio parameters for an audio device of the client, wherein respective ones of the parameters map to respective ones of the connection statuses. The server component may be operable to adjust a parameter of the audio device on the basis of the current status and according to the profile list.

In such a server device, the server component may be operable to send data to the client device over the virtual channel, the data representing a time period between a timestamp in a message received by the server device from the client device and a current timestamp value of the server device.

According to another aspect of the present invention, there is provided a client device comprising a client component operable to receive data from a server device over a virtual channel, the data representing a mitigating action relating to latency in a network connection between the server device and the client device, and to execute such a mitigating action.

In such a client device, the mitigating action may serve to reduce the latency in the connection, or may serve to reduce an effect on a user of the latency in the connection.

In such a client device, the client component may be operable to receive a profile list including multiple display parameters for a display device of the client device, wherein the parameters represent respective connection statuses.

In such a client device, the client component may be operable to adjust a parameter of the display device on the basis of the current status and according to the profile list.

In such a client device, the multiple display parameters may include a resolution and colour depth for the display device.

In such a client device, the client component may be operable to provide a profile list including multiple audio parameters for an audio device of the client, wherein respective ones of the parameters map to respective ones of the connection statuses. The client component may be operable to adjust a parameter of the audio device on the basis of the current status and according to the profile list.

In such a client device, the client component may be operable to receive data from the server device over the virtual channel, the data representing a time period between a timestamp in a message received by the server device from the client device and a current timestamp value of the server device.

In such a client device, the client component may be operable to provide the latency value to a remote monitor over a network.

BRIEF DESCRIPTION OF THE DRAWINGS

An embodiment of the invention will now be described, by way of example only, and with reference to the accompanying drawings, in which.

DETAILED DESCRIPTION

An application sharing system typically uses server and client side components which utilise technologies that are common to multiple implementations, such as implementations suitable for multiple different operating systems for example. A system can use a number of discrete I/O endpoints within a data stream to provide multiple data channels. The system can multiplex these data channels whilst handling buffering and transmission thereby making it possible for data to be transmitted bi-directionally using API calls to transmit data and to register callback mechanisms to handle reception of data for example. The multiple discrete I/O endpoints define a set of virtual channels for the system which can be used internally to handle operations such as cut-and-paste operations to take place between the remote (server) and local (client) systems, and also for the redirection of sound and to share storage devices between the systems for example.

In an example, an application sharing system can utilise the remote desktop protocol, which is a known protocol to allow a user to remotely log in to a networked device. Typically, at a server side, a remote desktop services server runs which facilitates connection from suitable client side software which allows a user to remotely log in to the networked device operating as the server. Client side components can present a desktop interface (application GUI) of the remote server system.

Remote desktop protocol allows the creation of virtual channels, which allow other devices, such as disc, audio, printers, and COM ports to be redirected. That is, the channels act as a replacement for these devices. Typically, the channels connect to the client over a TCP (transmission control protocol) connection, and, as the channels are accessed for data, a client is informed of the request, which is then transferred over the TCP connection to the application.

Currently the only way of checking network connectivity in a remote desktop protocol environment is for a user to leave the hosted virtual desktop application and be talked through a series of network tests by helpdesk personnel for example. This is difficult and time consuming. It is also not supported on the majority of thin client devices, so diagnostics are only possible where a user is connecting from a full PC and has access to network tools.

According to an example, a method and system uses a virtual channel for bandwidth monitoring. Latency data representing latency between server and client sides of a system can be provided or requested. A request can come from an external monitoring application or device which uses data from the virtual channel for example. In an example, latency data can be used to automatically and dynamically adjust characteristics at the client side of the system. For example, colour depth and/or screen resolution can be dynamically adjusted on the basis of the latency data in order to optimise use of available bandwidth and network speed.

Figure 1:
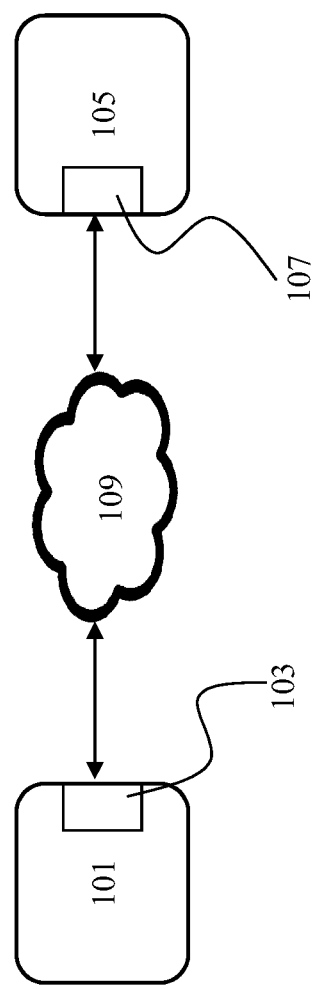
FIG. 1 is a schematic block diagram of a system according to an example.

FIG. 1 is a schematic block diagram of a system according to an example. A server device 101, which can be a remote device, includes a server component 103 which provides remote connection functionality. For example, server component 103 can be a remote desktop protocol server application which allows applications or the desktop of the device 101 to be made accessible to a client device 105, which can be a remote client device—that is, a physically separated device which can be connected to the internet for example. Server component 103 can authenticate client devices such as device 105, as well as making applications and the desktop of device 101 available remotely for viewing and interaction. In an example, component 103 can restrict clients according to a level of access.

Server component 103 establishes a socket endpoint which listens for inbound connections on a TCP port, such as TCP port 3389 for example. Client device 105 includes a client side application 107 for remote desktop services. Application 107 allows a user of device 105 to remotely log in to a networked device running a remote desktop services server, such as device 101 for example. Application 107 can present the desktop interface of device 101 on a display of the device 105 as if it were being accessed locally. Accordingly, control of certain or all applications and functions of device 101 can be provided at device 105.

Any input provided at client device 105 is redirected via component 107 over a network 109 to the server component 103 of server device 101 where all application execution takes place. Network 109 can be the internet for example, or any other suitable network, such as a LAN. The server and client devices can communicate over the network 109 using TCP for example. Accordingly, a connection between the client and the server can be a TCP connection.

In an example, the system of FIG. 1 uses cached glyphs and bitmaps for transmission across network 109. For example, most dialog boxes consist of text items, a series of gray, white, colored and so on rectangles, and light and dark shaded lines for a 3D effect. In an example, these are not transmitted as comparative deltas from the previous screen, but are encoded as pattern bits and cached glyphs. For instance, a gray dialog box background color can be drawn with "Draw color X at $x_1$, $y_1$, $x_2$, $y_2$". Field compression can be enabled such that a second draw with only a change in the $x_1$, $y_1$ position would send an even smaller packet with a single bit representing the fields that have not changed, and the minimum possible number of bits to represent the delta change in the coordinates.

Text can be displayed using glyph caching. That is, the client can build up a required set of glyphs, and the server need only transmit a short hash value to display the text. Bitmap caching can work similarly.

According to an example, component 103 includes or otherwise invocates a "system tray" application which is started at user login. This application periodically checks to see if it is running within a terminal services session, and if so, actively communicates with the client end of the connection, and displays an indicator in the system tray. It also allows the user to monitor a current latency (in milliseconds for example), and a current quality level classification of the connection or latency status which can be classified as "good", "average" or "poor" for example.

The component 107 can include the following:
An extension to a remote desktop protocol application to add a new virtual channel. In an example, this new virtual channel can support the passing of data to the system tray application of component 103 of device 101, which can calculate and maintain average latency statistics.
A mechanism to communicate with an external connection monitoring application, which can be launched by the virtual channel component and can request latency data for example.

Figure 2:
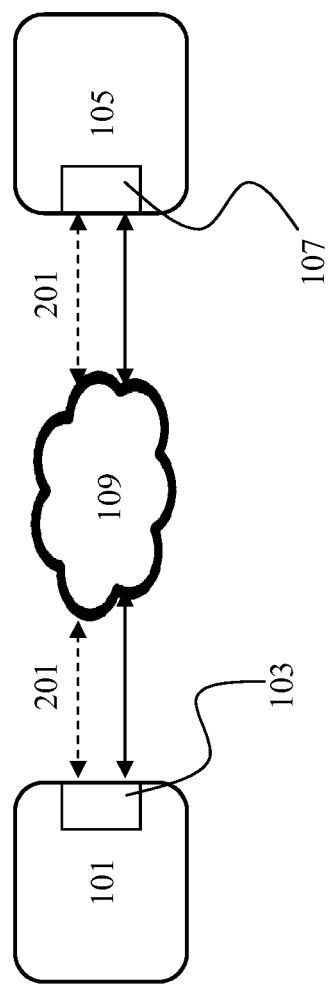
FIG. 2 is a schematic block diagram of a system according to an example.

FIG. 2 is a schematic block diagram of a system according to an example. A virtual channel 201 enables communication of data between client 105 and server 101 via network 109. For example, data representing a latency of the connection between server 101 and client 105 can be provided over channel 201. According to an example, channel 201 can be used to transmit messages which encode data representing at least the latency of the system. For example, three message types can be supported. These messages can start with a 16-bit "message type" value which uniquely identifies the type of message. In an example, valid message types are:

MSG_READY—this is sent from the server 101 to the client 105 to notify it that a system tray application or component 103 on the server 101 is ready to receive messages. In an example, the message contains no data except for the 16-bit message type.

MSG_REQUEST—this is sent from the client 105 to the server 101 and can include the following data:
16 bit message type (always MSG_REQUEST)
32 bit length—this is the size of all of the remaining data
32 bit timestamp—this is the length of time (such as the number of milliseconds) which has elapsed since a predetermined time (such as midnight on the 1 Jan. 1970 for example), according to the client system
32 bit average latency—this is the current average latency as calculated by the client application
8 bit connection status code—one of CATEGORY_ESTABLISHING, CATEGORY_GOOD, CATEGORY_AVERAGE or CATEGORY_POOR MSG_RESPONSE—this is sent from the server 101 to the client 105 in response to a MSG_REQUEST message and contains the same data as for the MSG_REQUEST message, except that the message type is MSG_RESPONSE.

According to an example, when the application of component 103 starts, it defaults its connection status to CATEGORY_OFFLINE. A system tray icon can be shown, displaying an offline status indicator (which can be grey in colour for example) with the word RDP or other similar identifier underneath it. Hovering a mouse pointer or pointer of another input device over the icon at this point can display a tooltip stating that no terminal services session is active.

The application can then check the session information to see if a user is logged in, such as using Terminal Services for example. If not, the application waits for a second, or other suitable predetermined period of time, then checks again. In an example, this checking process can repeat until a session is identified.

The application waits until an active session is identified. When this occurs, it connects to the virtual channel 201 and sends a MSG_READY message to the client 105.

The application then enters a loop, waiting for an incoming message from the client. If no message arrives within, for example, eight seconds, the MSG_READY message is sent and the loop is re-started.

If a message arrives, it is parsed to make sure it is an MSG_REQUEST message. If not, an MSG_READY is sent to the client to reset it. Otherwise, the average latency and connection status are read from the message, and an MSG_RESPONSE is returned to the client 105. According to an example, the data read from the message is used to set the tooltip text for the tray application as well as the colour of the indicator, which can alter depending on a connection status or latency value—for example, green can indicate a good status, amber an average status, and red a poor status. Other alternatives are possible. The application then returns to the start of the loop, awaiting the next MSG_REQUEST.

If at any point communication times out or a Terminal Services session is terminated, the application can enter a cycle of sleep-check-retry until the service is re-established, at which point it sends a RESTART message to the client 105 to advise it that communications had been interrupted. This loop can continue until the application is terminated, either by a system shutdown, user log off or by the user terminating the application from a Quit menu for example.

Therefore, in an example, the current average latency and connection status are shown in the tooltip which appears when hovering over the icon in the system tray, and also via the colour of the system tray icon itself. Right-clicking on the icon and selecting "Status" from the pop-up menu can display a dialog where this information is also shown and dynamically updated, without the need to keep hovering the mouse pointer over the system tray icon. The application can exit when the user logs off, or the system is shut down. In an example, disconnecting from the session leaves the application running. The user may also manually shut down the application by right-clicking the icon in the system tray area and selecting "Quit" from the pop-up menu for example. In an example, information relating to the latency of a connection can be made available in a connection bar, such as a connection bar specific to the Microsoft remote desktop protocol client for example, either in addition to or in place of system tray information. If a network connection is very slow, a system tray update may not be available for some time. However, it will be seen in the connection bar as this executes locally.

According to an example, a remote desktop latency monitor, such as an external monitor device or application, uses a remote desktop protocol compliant tool. The following activities can be carried out by the monitor:

callback functions are registered with the tool to allow it to be notified of incoming data and other significant events (such as system shutdown);

an empty linked list is created to store data representing latency values, and the current average latency value is set to zero;

an anonymous pipe mechanism is created, and the process is forked in two;

a new child process ties its input and output streams to one end of the pipe, then launches an external application such as an external monitor. The following command-line arguments can be passed to the process:

The fully-qualified host name and IP (Internet Protocol) address of the remote system The process ID of the main tool process.

The original command line used to start the tool session (as a series of separate arguments)

The parent process stores the file descriptor which represents the other end of the pipe, for use in communicating with the external monitoring component.

The tool can then start up normally. Whenever the tool receives incoming data on the virtual channel 201, it can call the registered processing function to notify it of a new message. According to an example, messages can be handled as follows:

If the message type is READY, any existing list of latency values can be emptied. A REQUEST message can then be sent to the server 101 containing the current timestamp (expressed in milliseconds since midnight on 1 Jan. 1970 as described above for example), along with a current average latency of zero and a connection status of ESTABLISHING.

If a response message type is RESPONSE, the timestamp portion of the message is extracted and subtracted from the current system timestamp. The resulting value represents the latency (or "ping time") of the connection during the request-response cycle. The latency value is then added on to the end of a linked list of latencies. In an example, a maximum of 100 latency values can be held, so if 100 have already been stored, the oldest is removed from the list before adding the latest one. Other alternatives are possible including other predefined maximum numbers and the provision of a user selected maximum for example. The average latency is recalculated by taking the mean of all of the values currently stored. In one example, these latency values are stored, either in a local file or externally in a database, in order that a longer term history of latency can be kept.

At this point, if an external monitoring application has been launched, the pipe is checked for inbound data. If a MONITOR_QUERY message is present, the current latency value and connection classification are sent back as a MONITOR_RESPONSE message to the file descriptor which connects to the anonymous pipe to the external monitor.

According to an example, three counts are held alongside the linked list, representing running totals of consecutive latencies, in order to establish an appropriate gauge for the quality of the connection. Whenever a new average latency value is calculated, it is used to determine whether the connection status should be changed. In the example, a latency value of a maximum of 100 ms is considered good. One of 300 ms or more is considered poor, and anything between the two is considered as average.

This classification is then used to increment an appropriate counter—either good, average or poor—to a maximum of ten or other suitable number which can be predefined or user selectable. The other two counters are decremented, to a minimum of zero. If the increment to a counter has caused it to reach ten, the overall classification of the connection status is changed to match the appropriate level.

For example, a connection may have had ten consecutive "good" pings, resulting in the following counter values:
i. GOOD: 10
ii. AVERAGE: 0
iii. POOR: 0

This classifies the connection as "good".

The connection may start to degrade, resulting in the following values after, for example, six more pings:
i. GOOD: 4
ii. AVERAGE: 3
iii. POOR: 3

The connection is thus still classified as "good", as it has not yet reached a stable enough sequence of pings to be re-classified. However, if the next seven (for example) pings are all poor, the counters are now:
i. GOOD: 0
ii. AVERAGE: 0
iii. POOR: 10

The connection is now re-classified as "poor".

Using such a threshold mechanism to define a connection status avoids a status continually changing with spikes in the network traffic.

After processing, the system sleeps for around 1 second in order to avoid saturating a Terminal Services connection. It then sends a REQUEST message to the server 101, containing the current timestamp (expressed in milliseconds since midnight on 1 Jan. 1970), along with the current average latency.

When a Terminal Services session is disconnected (either through network timeout, system shutdown or directly by the user), the system is notified by tool through a generic mechanism common to all virtual channels. In an example, it can use this notification to clear down any allocated memory before terminating. It can also send a termination signal to any external connection monitor process which may have been started.

Figure 3:
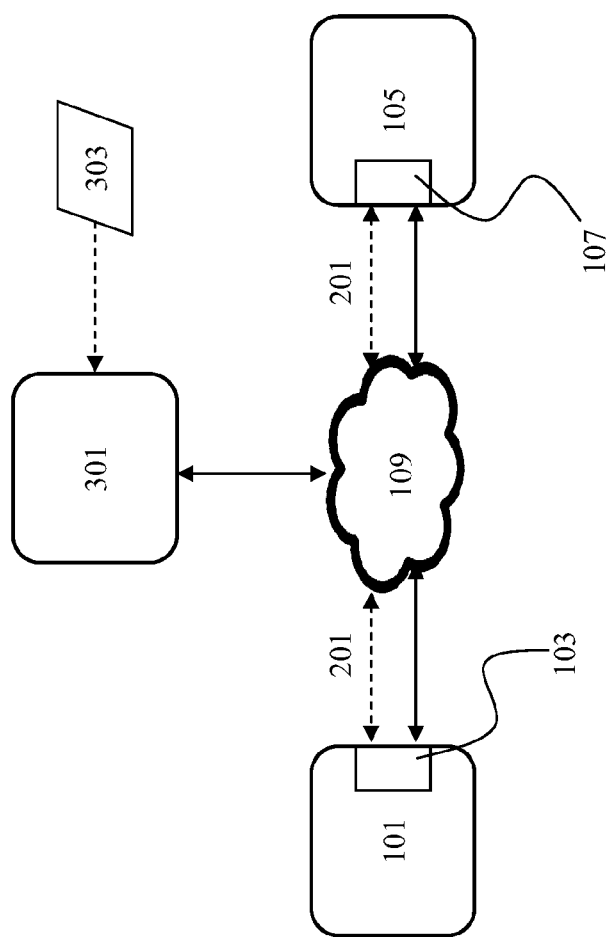
FIG. 3 is a schematic block diagram of a system according to an example.

FIG. 3 is a schematic block diagram of a system according to an example. An external connection monitor 301 is a stand-alone device or application which can be launched when the virtual channel 201 is initialised. Monitor 301 can be provided with or can request data about the connection between server 101 and client 105. More specifically, monitor 301 can be provided with or request latency data representing the latency of the connection which is established between the server 101 and the client 105. In an example, the data can be used to carry out connection reconfiguration actions to mitigate latency issues. For instance, reconfiguration actions can include reducing screen resolution or screen size at the client 105, and/or reducing a colour depth at the client 105 and/or change audio playback quality at the client 105.

Upon initialisation, monitor 301 can access a user's connection monitor profile 303. In an example, profile 303 can be a text file consisting of a multiple sections representing respective hosts for which the user wishes to enable latency management. Within each section, three entries are provided representing each of the connection types GOOD, AVERAGE and POOR along with the screen bit depth and geometry considered appropriate for the classification. Such parameters can be configured by a user, or predefined. Any hosts not defined in profile 303 can be passively monitored.

Similarly, audio playback quality at the client can be modified in dependence upon the connection quality. Data relating to appropriate audio quality for each of GOOD, AVERAGE and POOR connection types are stored, and used when appropriate.

According to an example, the start of a host section in profile 303 can be identified by the token:
  i. HOST hostname
    where hostname can either be the fully-qualified name of the system, or its IP address.
The end of a host section can be identified by the token:
  i. END-HOST
Within a host section of profile 303, three entries are present, and can be on separate lines or separated/delimited by a suitable symbol or a delimiter such as a hashtag or other symbol for example. Each line can be formatted as follows:
  CONNECTION class WIDTH width HEIGHT height DEPTH depth where:
  class is one of "GOOD", "AVERAGE" or "POOR";
  width is the width of the screen in pixels;
  height is the height of the screen in pixels; and
  depth is the bit-depth of the screen.
An example entry for the host "myhost.mydomain" might be:
  HOST myhost.mydomain
  CONNECTION GOOD WIDTH 1280 HEIGHT 1024 DEPTH 32
  CONNECTION AVERAGE WIDTH 1024 HEIGHT 768 DEPTH 24
  CONNECTION POOR WIDTH 800 HEIGHT 600 DEPTH 16
  END-HOST The connection monitor 301 parses the profile file 303 to identify whether there is an entry which matches either the fully-qualified remote host name or IP address, such data having been supplied as command line arguments when the process was started for example. If a matching entry is determined, the CONNECTION entries are parsed to establish a profile for handling latency changes for the connection and this profile can be stored in a memory of the monitor 301. If no matching entry is found, a message can be output to a standard error output for the session to notify the user that proactive latency management will not take place. The process can then terminate.

According to an example, when monitor 301 is initialised, it enters a request-response loop which sends a MONITOR_QUERY message to a virtual channel extension via the pipe associated with its standard output stream. It then waits for a response on the standard input stream. If no response is received within a predetermined timeout period, the MONITOR_QUERY message is sent again.

If a response is received, this is a MONITOR_RESPONSE message in an example. This message is parsed, and any resulting actions are taken and the process sends a new MONITOR_QUERY message. This activity repeats until a termination signal is received from the client.

According to an example, the MONITOR_QUERY message consists of the following data:
  16 bit Message type—which is MONITOR_QUERY
  32 bit Message length in bytes—always 6
The MONITOR_RESPONSE message consists of the following data:
  16 bit Message type—which is MONITOR_RESPONSE
  32 bit average latency—this is the current average latency as calculated by the client application.
  8 bit connection status code—one of CATEGORY_ESTABLISHING, CATEGORY_GOOD, CATEGORY_AVERAGE or CATEGORY_POOR.

When a MONITOR_RESPONSE message is received, it is analysed to determine whether the connection should be reconfigured. If the connection status code was CATEGORY_ESTABLISHING, no action is taken. Otherwise, if this is the first time a status has been received, the status is stored as the current connection status and the request-response loop continues.

If this is not the first time a status has been received, the status code is compared to the stored status. If it is determined that the connection status has changed, a Connection Reconfiguration process initiates.

Figure 4:
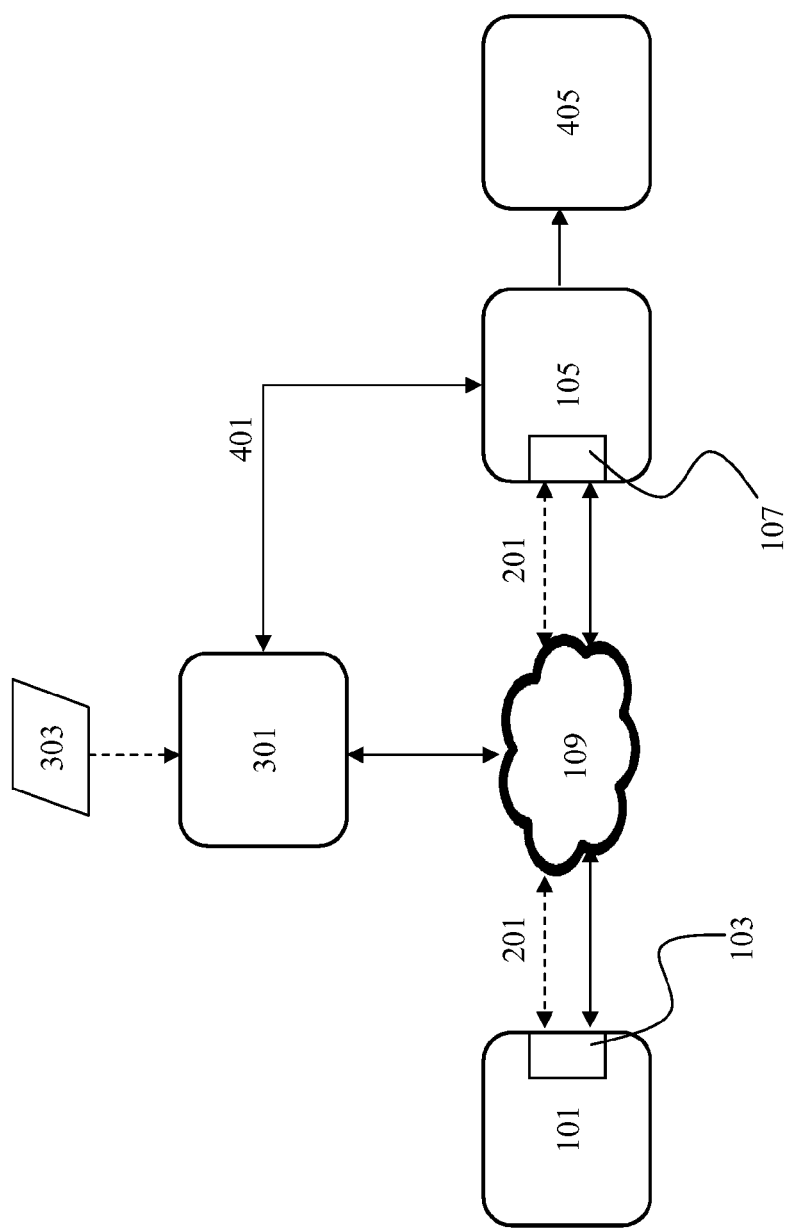
FIG. 4 is a schematic block diagram of a system according to an example.

FIG. 4 is a schematic block diagram of a system according to an example. When the need for connection reconfiguration has been established, the following activities occur.

The stored profile in file 303 for the remote host is accessed to identify the requested screen geometry and depth for the current connection status for a display 405. If the geometry and depth are the same as for the previous connection status, no action is taken, and the request-response loop continues. If the geometry and depth are different, a system modal dialog box can be output to display 405 to indicate to the user that reconfiguration may take place. This dialog offers the options to either reconfigure the session, or to continue with the current session. Additionally, a checkbox can allow the user to switch off dynamic connection management for the remainder of the session.

If the user elects to continue without any action, the dialog box is removed. If the checkbox was selected, the external monitor 301 is terminated—otherwise, the request-response loop continues.

If the user elects to reconfigure the connection, the connection monitor 301 sends a termination signal to the main process, using the process ID originally passed in on the command line. A new process is then created, using the original parameters supplied on the command line. The external monitor 301 process then terminates.

Note that the external monitor process terminates itself if no profile is found for the current host; if the user cancels all dynamic connection management; or when it launches a new session.

In an example, a user can choose to change connection properties based upon the network latency data. Accordingly, adaptation based on the latency data can be manual, such as by user intervention to alter one or more properties or parameters of the system they are interacting with, such as by altering a screen resolution for example, or automatic, such that automated adaption is used to alter one or more properties or parameters.

Connection data can be stored both locally for the end user and in a datacentre by a service provider for example.

Figure 5:
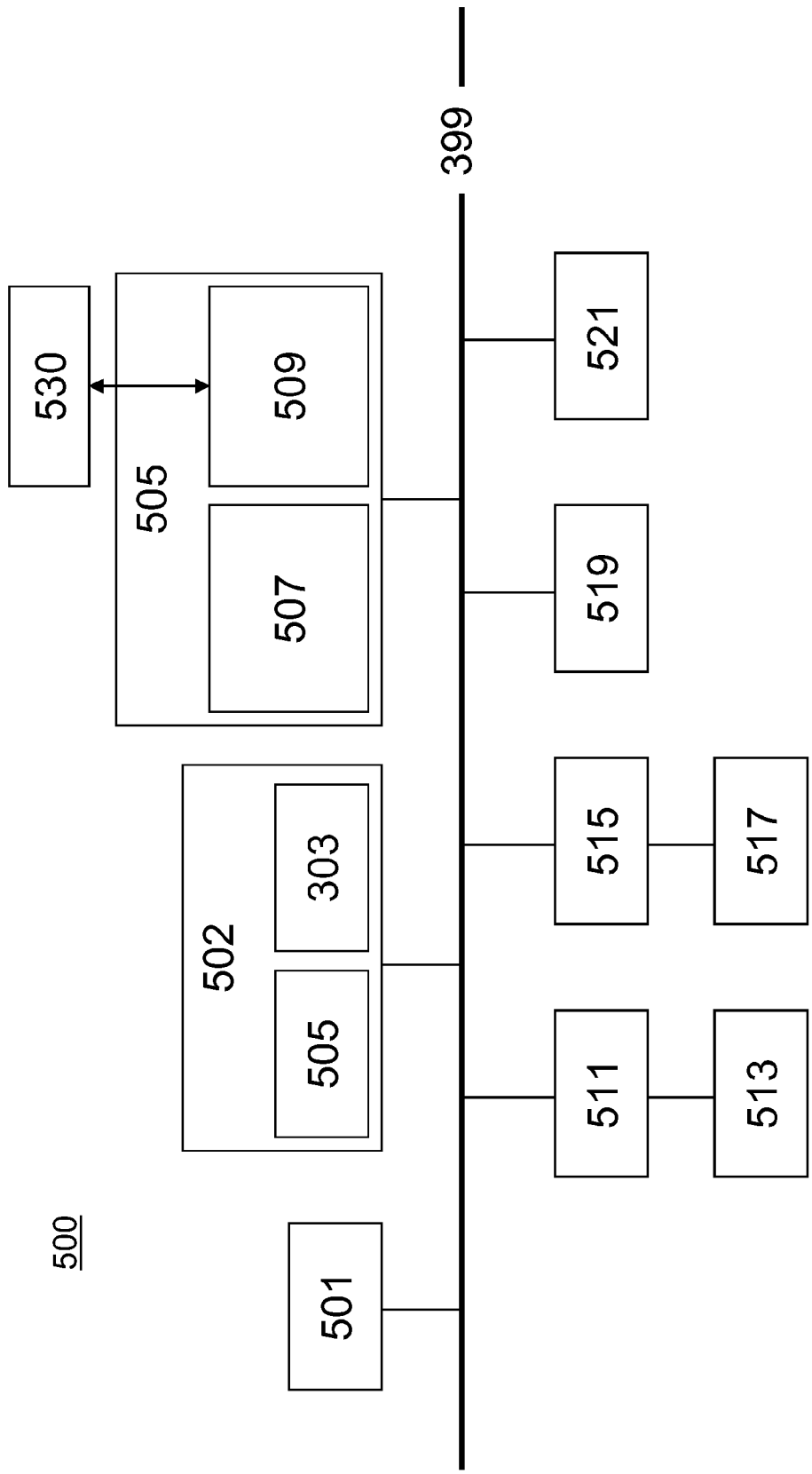
FIG. 5 is a schematic block diagram of a monitor device according to an example.

FIG. 5 is a schematic block diagram of a monitor device according to an example. Device 500 can include one or more processors, such as processor 501, providing an execution platform for executing machine readable instructions such as software. Commands and data from the processor 501 are communicated over a communication bus 399. The device 500 also includes a main memory 502, such as a Random Access Memory (RAM), where machine readable instructions may reside during runtime, and a secondary memory 505. The secondary memory 505 includes, for example, a hard disk drive 507 and/or a removable storage drive 530, representing a floppy diskette drive, a magnetic tape drive, a compact disk drive, etc., or a nonvolatile memory where a copy of the machine readable instructions or software may be stored. The secondary memory 505 may also include ROM (read only memory), EPROM (erasable, programmable ROM), EEPROM (electrically erasable, programmable ROM). In addition to software, latency data, both current and historic as well as threshold values for example may be stored in the main memory 502 and/or the secondary memory 505.

The removable storage drive 530 reads from and/or writes to a removable storage unit 509 in a well-known manner.

The components and elements of device 500 are also representative of client device 105 and server device 101. A user can interface with the device 500 with one or more input devices 511, such as a keyboard, a mouse, a stylus, and the like in order to provide user input data such as data representing a mitigating action. For example, at the client side, the display adaptor 515 can interface with the communication bus 399 and the display 517 and receive display data from the processor 501 and convert the display data into display commands for the display 517. A network interface 519 is provided for communicating with other systems and devices via the network. That is, in the case of the client device the network interface can be used to communicate with the server and vice versa. In the case of the monitor device, the interface can be used by the monitor device to communicate with the client and/or server as desired. The system can include a wireless interface 521 for communicating with wireless devices in the wireless community.

It will be apparent to one of ordinary skill in the art that one or more of the components of the device 500 may not be included and/or other components may be added as is known in the art. The device 500 shown in FIG. 5 is provided as an example of a possible platform that may be used for client, server and monitor device for example, and other types of platforms may be used as is known in the art. One or more of the steps described above may be implemented as instructions embedded on a computer readable medium and executed on the device 500. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

According to an example, a profile 303 can reside in memory 502. A set of latency values 505 can also be provided in memory 502. A storage device 111 can include a HDD such as 505, or can be provided as a removable storage unit 509.

A method and system according to an example can serve to reduce support calls relating to remote desktop use by ensuring that end-users are made aware of issues relating to connectivity and when issues relate to the network rather than other factors for example. This is important for a service provider that may be supplying the server for the remote connection termination, but not the network. For example, statistical evidence can be available to both the user and the end user that the issue lies in the network. This is data that can be presented to the network provider.

A system and method according to an example therefore enables service providers to evaluate the quality of network connections for their customers' connections, and if desired to recommend how to improve the quality of the connection, or to find a suitable alternative network provider.

In an example, a method will also work where a Terminal Services Gateway server is used that allows incoming connections on a defined port, e.g. port 443 for HTTPS, which is then forwarded as port 3389 for RDP. Normal network tests will not change ports, so this provides a secure method of testing latency without opening ports or any additional firewall configuration at either end (client or server).

Where connectivity is poor, a method according to an example can be used as a "keep alive" to ensure that the connection is less likely to drop, e.g. might be used on a mobile wireless network such as UMTS (3G) or other network. It can also be applied to other virtual channel based remote display protocols such as ICA for example.

Service Providers can use latency data, statistical data derived from the latency data, and IP address data to understand the performance and experience of their client's connections. This can be used to demonstrate why a user should move from one Internet Service Provider to another, and also to determine where users are connecting from in the World.

What is claimed is:

1. A computer implemented method for performing automatic latency mitigation in a remote access system, comprising:
    using a network connection between a client in remote access with a server to define a virtual channel for determining latency in the network connection, and providing a latency value for the connection;
    compiling a limited running list of historic latency values, and using the list to determine an average value for the latency between the client and server;
    providing multiple threshold values representing respective different connection statuses;
    assigning a status for the connection using the average value;
    incrementing or decrementing a counter associated with the statuses based on the assigned status to provide a current status for the connection;
    using the latency value to determine a mitigating action relating to the latency in the connection; and
    executing the mitigating action at the client.

2. A computer implemented method as claimed in claim 1, wherein the mitigating action serves to reduce the latency in the connection.

3. A computer implemented method as claimed in claim 1, wherein the mitigating action serves to reduce an effect on a user of the latency in the connection.

4. A computer implemented method as claimed in claim 1, wherein the virtual channel is used to transmit data representing the latency value between the client and the server using the network connection.

5. A computer implemented method as claimed in claim 1, further comprising
    providing a profile list including multiple display parameters for a display device of the client, wherein respective ones of the parameters map to respective ones of the connection statuses.

6. A computer implemented method as claimed in claim 5, further comprising
    adjusting a parameter of the display device on the basis of the current status and according to the profile list.

7. A computer implemented method as claimed in claim 1, wherein multiple display parameters for a display device include a resolution and colour depth.

8. A computer implemented method as claimed in claim 1, further comprising:
providing a profile list including multiple audio parameters for an audio device of the client,
wherein respective ones of the parameters map to respective ones of the connection statuses.

9. A computer implemented method as claimed in claim 1, further comprising:
providing a profile list including multiple audio parameters for an audio device of the client; and
adjusting a parameter of the audio device on the basis of the current status and according to the profile list,
wherein respective ones of the parameters map to respective ones of the connection statuses.

10. A computer implemented method as claimed in claim 1, wherein the latency value is determined using a difference between a timestamp in a message received by the server from the client and a current timestamp value of the server.

11. A computer implemented method as claimed in claim 1, wherein the network connection is a TCP connection.

12. A server comprising a server component to receive data from a client over a virtual channel representing a value for the latency in a physical connection for remote access therebetween, wherein
the server component is operable to compile a limited running list of historic latency values, and
to use the list to determine an average value of latency between the client device and server device, and
to provide multiple threshold values representing respective different connection statuses, to assign a status for the connection using the average value, to increment or decrement a counter associated with the statuses based on the assigned status to provide a current status for the connection, and
to provide a profile list including multiple display parameters for a display device of the client device, wherein respective ones of the parameters map to respective ones of the connection statuses,
to use the latency value to determine a mitigating action relating to the latency in the connection, and to send instruction data to such a client in order to execute the mitigating action at the client.

13. A server as claimed in claim 12, wherein the mitigating action serves to reduce the latency in the connection.

14. A server as claimed in claim 12, wherein the mitigating action serves to reduce an effect on a user of the latency in the connection.

15. A server as claimed in claim 12, wherein the server component is operable to use the virtual channel to transmit data representing the latency value between the client device and the server device, to the client device using the network connection.

16. A server as claimed in claim 12, wherein the server component is further operable to adjust a parameter of the display device on the basis of the current status and according to the profile list, wherein respective ones of the parameters map to respective ones of the connection statuses.

17. A server as claimed in claim 12, wherein the multiple display parameters include a resolution and colour depth for the display device.

18. A server as claimed in claim 12, wherein the server component is operable to send data to the client device over the virtual channel, the data representing a time period between a timestamp in a message received by the server device from the client device and a current timestamp value of the server device.

19. A server as claimed in claim 12, and further comprising a client component operable to receive data from the server device over a virtual channel, the data representing a mitigating action relating to latency in a network connection between the server device and the client device, and to execute such a mitigating action.

20. A server as claimed in claim 19, wherein the mitigating action serves to reduce the latency in the connection.

21. A server as claimed in claim 19, wherein the mitigating action serves to reduce an effect on a user of the latency in the connection.

22. A server as claimed in claim 19, wherein the client component is operable to receive a profile list including multiple display parameters for a display device of the client device, wherein the parameters represent respective connection statuses.

23. A server as claimed in claim 19, wherein the client component is operable to receive a profile list including multiple display parameters for a display device of the client device, wherein the parameters represent respective connection statuses, and to adjust a parameter of the display device on the basis of the current status and according to the profile list.

24. A server as claimed in claim 19, wherein the client component is operable to receive a profile list including multiple display parameters for a display device of the client device, wherein the parameters represent respective connection statuses, and wherein the multiple display parameters include a resolution and colour depth for the display device.

25. A server as claimed in claim 19, wherein the client component is operable to receive data from the server device over the virtual channel, the data representing a time period between a timestamp in a message received by the server device from the client device and a current timestamp value of the server device.

26. A server as claimed in claim 19, wherein the client component is operable to provide the latency value to a remote monitor over a network.

* * * * *